US012087266B2

(12) United States Patent
Barnes

(10) Patent No.: US 12,087,266 B2
(45) **Date of Patent: *Sep. 10, 2024**

(54) INSTABILITY MITIGATION IN AN ACTIVE NOISE REDUCTION (ANR) SYSTEM HAVING A HEAR-THROUGH MODE

(71) Applicant: Bose Corporation, Framingham, MA (US)

(72) Inventor: Christopher A. Barnes, Lynnfield, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,533

(22) Filed: Apr. 21, 2023

(65) Prior Publication Data

US 2023/0368768 A1 Nov. 16, 2023

Related U.S. Application Data

(63) Continuation of application No. 17/215,796, filed on Mar. 29, 2021, now Pat. No. 11,640,817, which is a (Continued)

(51) Int. Cl.

| | |
|---|---|
| ***G10K 11/00*** | (2006.01) |
| ***G10K 11/178*** | (2006.01) |
| *G10K 11/175* | (2006.01) |

(52) U.S. Cl.

CPC ...... *G10K 11/17833* (2018.01); *G10K 11/175* (2013.01); *G10K 2210/1081* (2013.01); *G10K 2210/3028* (2013.01)

(58) Field of Classification Search

CPC ......... G10K 11/175; G10K 2210/1081; G10K 2210/3028; G10K 29/00; G10K 29/004; H04R 29/00; H04R 29/004

(Continued)

(56) References Cited

U.S. PATENT DOCUMENTS

| | | | |
|---|---|---|---|
| 8,073,150 | B2 | 12/2011 | Joho et al. |
| 8,073,151 | B2 | 12/2011 | Joho et al. |

(Continued)

OTHER PUBLICATIONS

European Search Report in EP Appln. No. 20176467, dated Nov. 17, 2020, 8 pages.

(Continued)

*Primary Examiner* — Disler Paul

(74) *Attorney, Agent, or Firm* — Fish & Richardson P.C.

(57) ABSTRACT

In one aspect a method that includes receiving an input signal captured by one or more first sensors associated with an active noise reduction (ANR) device, and processing the input signal using a first filter disposed in an ANR signal path to generate a first signal for an acoustic transducer of the ANR device. The input signal is processed in a pass-through signal path disposed in parallel with the ANR signal path to generate a second signal for the acoustic transducer, wherein the pass-through signal path allows a portion of the input signal to pass through to the acoustic transducer in accordance with a variable gain. One or more second sensors detect an existence of a condition likely to cause instability in the pass-through signal path, and in response, the variable gain is adjusted. A driver signal for the acoustic transducer is generated using an output based on the adjusted gain.

20 Claims, 6 Drawing Sheets

Related U.S. Application Data continuation of application No. 16/446,932, filed on Jun. 20, 2019, now Pat. No. 10,964,304.

(58) Field of Classification Search
USPC ............................ 381/74, 71.1, 71.6, 56–57
See application file for complete search history.

(56) References Cited

U.S. PATENT DOCUMENTS

| | | | | |
|---|---|---|---|---|
| 9,549,249 | B2 * | 1/2017 | Sontacchi | G10K 11/17854 |
| 9,854,349 | B2 * | 12/2017 | Murata | G10K 11/17821 |
| 9,986,326 | B2 * | 5/2018 | Murata | G10K 11/17873 |
| 10,096,313 | B1 | 10/2018 | Termeulen et al. | |
| 10,304,438 | B2 * | 5/2019 | Gether | G10K 11/17875 |
| 10,657,950 | B2 | 5/2020 | Hua et al. | |
| 10,741,164 | B1 | 8/2020 | Honda et al. | |
| 10,951,990 | B2 | 3/2021 | Nawfal et al. | |
| 10,964,304 | B2 | 3/2021 | Barnes | |
| 11,386,879 | B2 * | 7/2022 | Dahl | H04R 1/1083 |
| 11,640,817 | B2 | 5/2023 | Barnes | |
| 2010/0272276 | A1 | 10/2010 | Carreras | |
| 2011/0038496 | A1 | 2/2011 | Lott et al. | |
| 2012/0316872 | A1 | 12/2012 | Stoltz | |
| 2013/0163775 | A1 | 6/2013 | Yamkovoy et al. | |
| 2014/0270225 | A1 | 9/2014 | Gether | |
| 2015/0245136 | A1 | 8/2015 | Yamkovoy | |
| 2017/0365245 | A1 | 12/2017 | Ku et al. | |
| 2018/0286373 | A1 | 10/2018 | O'Connell et al. | |
| 2019/0035381 | A1 | 1/2019 | Maziewski et al. | |
| 2019/0110120 | A1 | 4/2019 | Sapozhnykov | |
| 2020/0035212 | A1 | 1/2020 | Yamabe | |
| 2020/0380948 | A1 | 12/2020 | Honda et al. | |
| 2020/0402493 | A1 | 12/2020 | Barnes | |
| 2021/0217400 | A1 | 7/2021 | Barnes | |

OTHER PUBLICATIONS

Office Action in European U.S. Appl. No. 20/176,467, dated Aug. 31, 2021, 8 pages.

* cited by examiner

INSTABILITY MITIGATION IN AN ACTIVE NOISE REDUCTION (ANR) SYSTEM HAVING A HEAR-THROUGH MODE

CLAIM OF PRIORITY

This application is a continuation application of U.S. patent application Ser. No. 17/215,796, filed on Mar. 29, 2021, which is a continuation of U.S. patent application Ser. No. 16/446,932, filed on Jun. 20, 2019, now U.S. Pat. No. 10,964,304, the entire contents of which are hereby incorporated by reference.

TECHNICAL FIELD

This disclosure generally relates to active noise reduction (ANR) devices having an operating mode in which external sounds from a user's environment are passed through, or reproduced, to the user.

BACKGROUND

Acoustic devices such as headphones can include active noise reduction (ANR) capabilities that block at least portions of ambient noise from reaching the ear of a user. Therefore, ANR devices create an acoustic isolation effect, which isolates the user, at least in part, from the environment. Some ANR devices have an operating mode referred to as aware mode, in which at least some ambient noise is deliberately passed through, or reproduced, to the user. In some cases, this operating mode may also be called "hear-through" mode, "talk-through" mode, or "pass-through" mode.

SUMMARY

In general, in one aspect, this document features a method that includes receiving an input signal captured by one or more first sensors associated with an active noise reduction (ANR) device, and processing the input signal using a first filter disposed in an ANR signal path to generate a first signal for an acoustic transducer of the ANR device. The method also includes processing the input signal in a pass-through signal path disposed in parallel with the ANR signal path to generate a second signal for the acoustic transducer, wherein the pass-through signal path is configured to allow at least a portion of the input signal to pass through to the acoustic transducer in accordance with a variable gain associated with the pass-through signal path. The method further includes detecting, using one or more second sensors, an existence of a condition likely to cause instability in the pass-through signal path, and in response, adjusting the variable gain associated with the pass-through signal path. The method also includes generating a driver signal for the acoustic transducer using an output of the pass-through signal path, the output being based on the adjusted gain.

In another aspect, this document features an active noise reduction (ANR) device that includes one or more first sensors configured to generate an input signal indicative of an external environment of the ANR device, an acoustic transducer configured to generate output audio, and a first filter disposed in an ANR signal path of the ANR device. The first filter is configured to process the input signal to generate a first signal for the acoustic transducer of the ANR device. The ANR device also includes a pass-through signal path disposed in parallel with the ANR signal path, the pass-through signal path configured to generate, based on the one or more first sensors, a second signal for the acoustic transducer. The pass-through signal path allows at least a portion of the input signal to pass through to the acoustic transducer in accordance with a variable gain associated with the pass-through signal path. The ANR device also includes one or more second sensors, and a controller that includes one or more processing devices. The controller is configured to detect, based on input from the one or more second sensors, an existence of a condition likely to cause instability in the pass-through signal path, and in response, adjust the variable gain associated with the pass-through signal path. The acoustic transducer is driven by a driver signal that is based on an output of the pass-through signal path, the output being based on the adjusted gain.

In another aspect, this document features one or more machine-readable storage devices having encoded thereon computer readable instructions for causing one or more processing devices to perform various operations. The operations include receiving an input signal captured by one or more first sensors associated with an active noise reduction (ANR) device, processing the input signal in an ANR signal path to generate a first signal for an acoustic transducer of the ANR device, and processing the input signal in a pass-through signal path disposed in parallel with the ANR signal path to generate a second signal for the acoustic transducer. The pass-through signal path allows at least a portion of the input signal to pass through to the acoustic transducer in accordance with a variable gain associated with the pass-through signal path. The operations also include detecting, using one or more second sensors, the existence of a condition likely to cause instability in the pass-through signal path, and in response, adjusting the variable gain associated with the pass-through signal path. The operations further include causing generation of a driver signal for the acoustic transducer using an output of the pass-through signal path, the output being based on the adjusted gain.

In various implementations, any of the above aspects can include one or more of the following features. The ANR signal path generating the first signal can be a feedforward ANR signal path. The one or more second sensors can include an infrared (IR) sensor, and/or a proximity sensor of the ANR device. Detecting the existence of a condition likely to cause instability in the pass-through signal path can include detecting, by a proximity sensor, that an object is within a predetermined distance from one of: the proximity sensor or one of the first sensors. Adjusting the variable gain associated with the pass-through signal path can include reducing the variable gain or setting the variable gain to substantially equal to zero. Adjusting the variable gain associated with the pass-through signal path can include adjusting a variable gain amplifier (VGA) disposed in the pass-through signal path. Adjusting the variable gain associated with the pass-through signal path can include selecting a set of coefficients for a filter disposed in the pass-through signal path. The one or more second sensors can be used to detect that the condition likely to cause instability in the pass-through signal path is no longer in existence, and in response, the variable gain associated with the pass-through signal path can be increased.

Two or more of the features described in this disclosure, including those described in this summary section, may be combined to form implementations not specifically described herein. The details of one or more implementations are set forth in the accompanying drawings and the description below. Other features, objects, and advantages will be apparent from the description and drawings, and from the claims.

DETAILED DESCRIPTION

Figure 1:
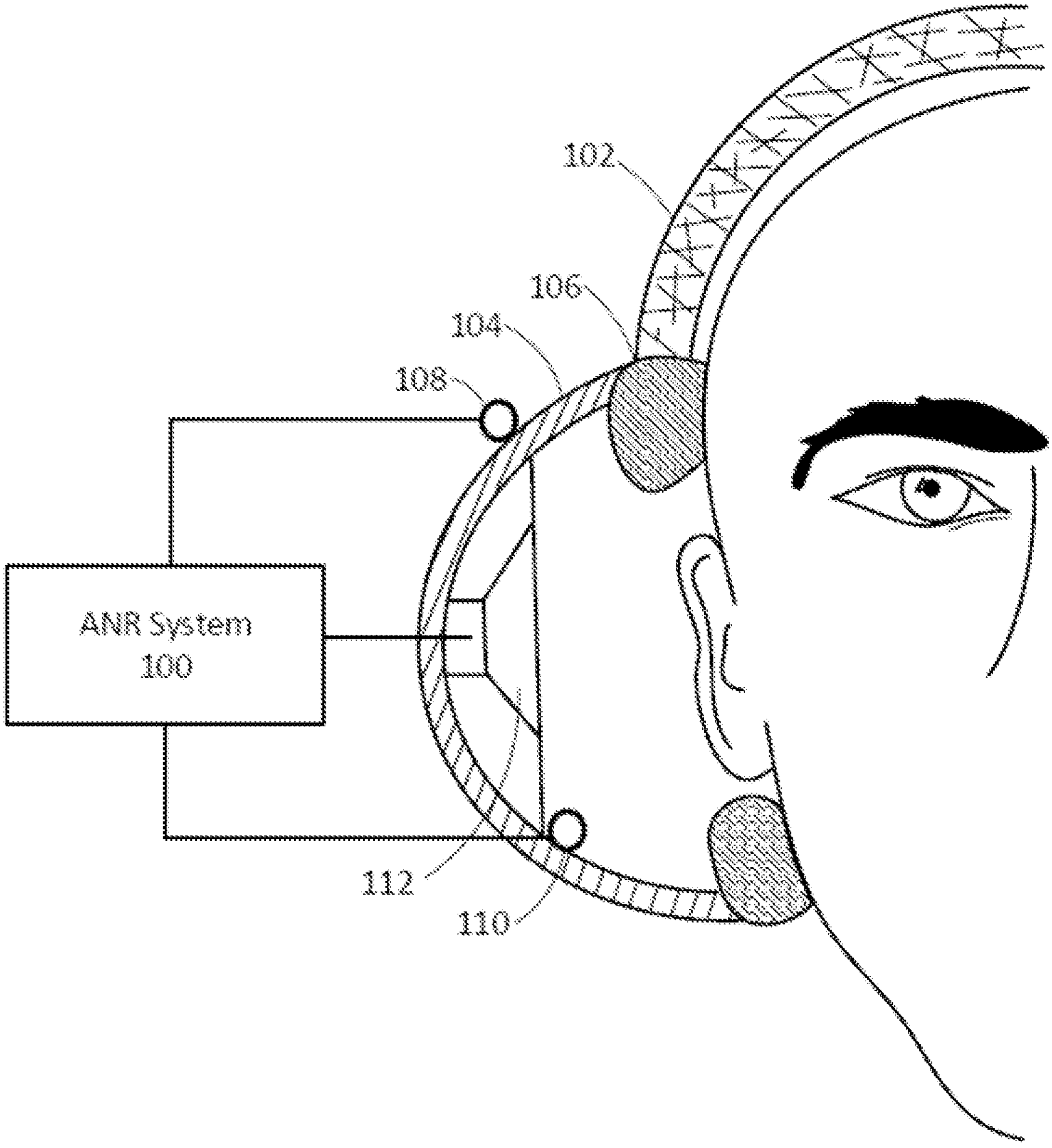
FIG. 1 shows an example of an active noise reduction (ANR) system deployed in a headphone.

This document describes technology that adjusts the gain of or otherwise modifies or disables a pass-through signal flow path in an Active Noise Reduction (ANR) system or device to improve system performance and reduce the likelihood of an unstable condition. In some ANR systems, a pass-through signal flow path can be included to implement a feature that may be referred to as "aware mode." In some cases, this feature may also be called "hear-through" mode, "talk-through" mode, or "pass-through" mode. In such a mode, the ANR system is configured to detect external sounds that the user might want to hear and pass such sounds through to be heard by the user. Example ANR systems with aware mode are described in further detail below with reference to FIG. 1. When an ANR system with aware mode is deployed, for example, in noise canceling headphones, certain unstable conditions can cause the headphones to generate an acoustic artifact (e.g., a loud noise) that is uncomfortable for the user. Such unstable conditions can be caused by coupling between a driver and a feedforward microphone of the ANR system, for example, when adjusting the position of the headphones. By detecting the presence or absence of potential causes for the unstable conditions and taking one or more actions in response, the technology described herein allows for the prevention of instabilities and acoustic artifacts in ANR systems with aware mode. For example, the one or more actions taken can include adjusting the gain of the pass-through signal flow path using a variable gain amplifier, adjusting the coefficients for a filter disposed in the pass-through signal flow path, and disabling/enabling the pass-through signal flow path. Furthermore, compared to ANR systems that exclusively implement signal processing approaches to detect and address existing instabilities, the sensor-based approach described herein prevents unstable conditions before they occur and may provide additional improvements to the cost, weight, and assembly of ANR systems with aware mode.

Active Noise Reduction (ANR) systems can be deployed in a wide array of acoustic devices to cancel or reduce unwanted or unpleasant noise. For example, ANR headphones can provide potentially immersive listening experiences by reducing the effects of ambient noise and sounds. The term headphone, as used herein, includes various types of such personal acoustic devices such as in-ear, around-ear or over-the-ear headphones, earphones, earbuds, and hearing aids, as well as open-ear audio devices like audio eyeglasses, and shoulder or body-worn audio devices. ANR systems can also be used in automotive or other transportation systems (e.g., in cars, trucks, buses, aircrafts, boats or other vehicles) to cancel or attenuate unwanted noise produced by, for example, mechanical vibrations or engine harmonics.

In some cases, an ANR system can include an electroacoustic or electromechanical system that can be configured to cancel at least some of the unwanted noise (often referred to as "primary noise") based on the principle of superposition. For example, the ANR system can identify an amplitude and phase of the primary noise and produce another signal (often referred to as an "anti-noise signal") of approximately equal amplitude and opposite phase. The anti-noise signal can then be combined with the primary noise such that both are substantially canceled at a desired location. The term substantially canceled, as used herein, may include reducing the "canceled" noise to a specified level or to within an acceptable tolerance, and does not require complete cancellation of all noise. ANR systems can be used in attenuating a wide range of noise signals, including, for example, broadband noise and/or low-frequency noise that may not be easily attenuated using passive noise control systems.

FIG. 1 shows an example of an ANR system 100 deployed in a headphone 102. The headphone 102 includes an ear-cup 104 on each side, which fits on, around or over the ear of a user. The ear-cup 104 may include a layer 106 of soft material (e.g., soft foam) for a comfortable fit over the ear of the user. The ANR system 100 can include or otherwise be coupled with a feedforward sensor 108, a feedback sensor 110, and an acoustic transducer 112. The feedforward sensor 108 may be a microphone or another acoustic sensor and may be disposed on or near the outside of the ear-cup 104 to detect ambient noise. The feedback sensor 110 may be a microphone or another acoustic sensor and may be deployed proximate (e.g., within a few millimeters) to the user's ear canal and/or the transducer 112. The transducer 112 can be an acoustic transducer that radiates audio signals from an audio source device (not shown) that the headphone 102 is connected to and/or other signals from the ANR system 100. While FIG. 1 illustrates an example where the ANR system is deployed in an around-ear headphone, the ANR system could also be deployed in other form-factors, including in-ear headphones, on-ear headphones, or off-ear personal acoustic devices (e.g., devices that are designed to not contact a wearer's ears, but may be worn in the vicinity of the wearer's ears on the wearer's head or body).

The ANR system 100 can be configured to process the signals detected by the feedforward sensor 108 and/or the feedback sensor 110 to produce an anti-noise signal that is provided to the transducer 112. The ANR system 100 can be of various types. In some implementations, the ANR system 100 is based on feedforward noise cancellation, in which the primary noise is sensed by the feedforward sensor 108 before the noise reaches a secondary source such as the transducer 112. In some implementations, the ANR system 100 can be based on feedback noise cancellation, where the ANR system 100 cancels the primary noise based on the residual noise detected by the feedback sensor 110 and without the benefit of the feedforward sensor 108. In some implementations, both feedforward and feedback noise cancellation are used. The ANR system 100 can be configured to control noise in various frequency bands. In some implementations, the ANR system 100 can be configured to control broadband noise such as white noise. In some implementations, the ANR system 100 can be configured to control narrow band noise such as harmonic noise from a vehicle engine.

Figure 2:
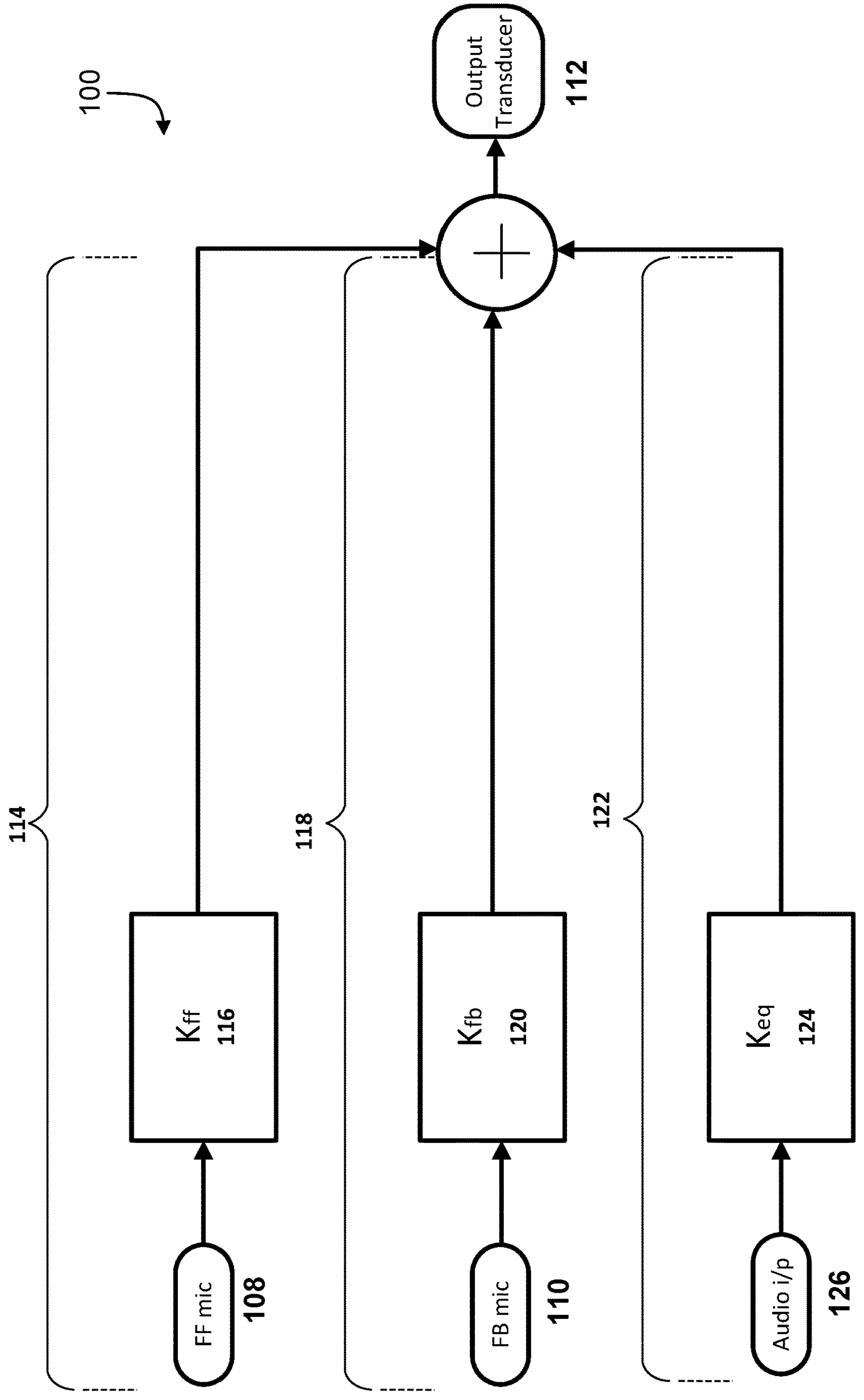
FIG. 2 is a block diagram of an example configuration of an ANR system.

In some implementations, the ANR system 100 can include a configurable digital signal processor (DSP) and other circuitry for implementing various signal flow topologies and filter configurations. Examples of such DSPs are described in U.S. Pat. Nos. 8,073,150 and 8,073,151, which are incorporated herein by reference in their entirety. The various signal flow topologies can be implemented in the ANR system 100 to enable functionalities such as audio equalization, feedback noise cancellation, and feedforward noise cancellation, among others. For example, as shown in FIG. 2, the signal flow topologies of the ANR system 100 can include a feedforward signal flow path 114 that drives the transducer 112 to generate an anti-noise signal (using, for example, a feedforward compensator 116) to reduce the effects of a noise signal picked up by the feedforward sensor 108. In another example, the signal flow topologies can include a feedback signal flow path 118 that drives the transducer 112 to generate an anti-noise signal (using, for example, a feedback compensator 120) to reduce the effects of a noise signal picked up by the feedback sensor 110. The signal flow topologies can also include an audio path 122 that includes circuitry (e.g., an equalizer 124) for processing input audio signals 126 such as music or communication signals, for playback over the transducer 112.

In some implementations, the headphone 102 can include a feature that may be referred to as "aware mode." In some cases, this feature may also be called "hear-through" mode, "talk-through" mode, or "pass-through" mode. In such a mode, the feedforward sensor 108 or other detection means can be used to detect external sounds that the user might want to hear, and the ANR system 100 can be configured to pass such sounds through to be reproduced by the transducer 112. In some cases, the sensor used for the aware mode feature can be a sensor, such as a microphone, that is separate from the feedforward sensor 108. In some implementations, signals captured by multiple sensors can be used (e.g., using a beamforming process) to focus, for example, on the user's voice or another source of ambient sound. In some implementations, the headphone 102 can allow for multi-mode operations including a wideband aware mode in which the ANR functionality may be switched off or at least reduced, over at least a range of frequencies, to allow relatively wideband ambient sounds to reach the user. In some implementations, the ANR system 100 can also be used to shape a frequency response of the signals passing through the headphones. For instance, the feedforward compensator 116 and/or the feedback compensator 120 may be used to change an acoustic experience of having an earbud blocking the ear canal to one where ambient sounds (e.g., the user's own voice) sound more natural to the user.

Figure 3:
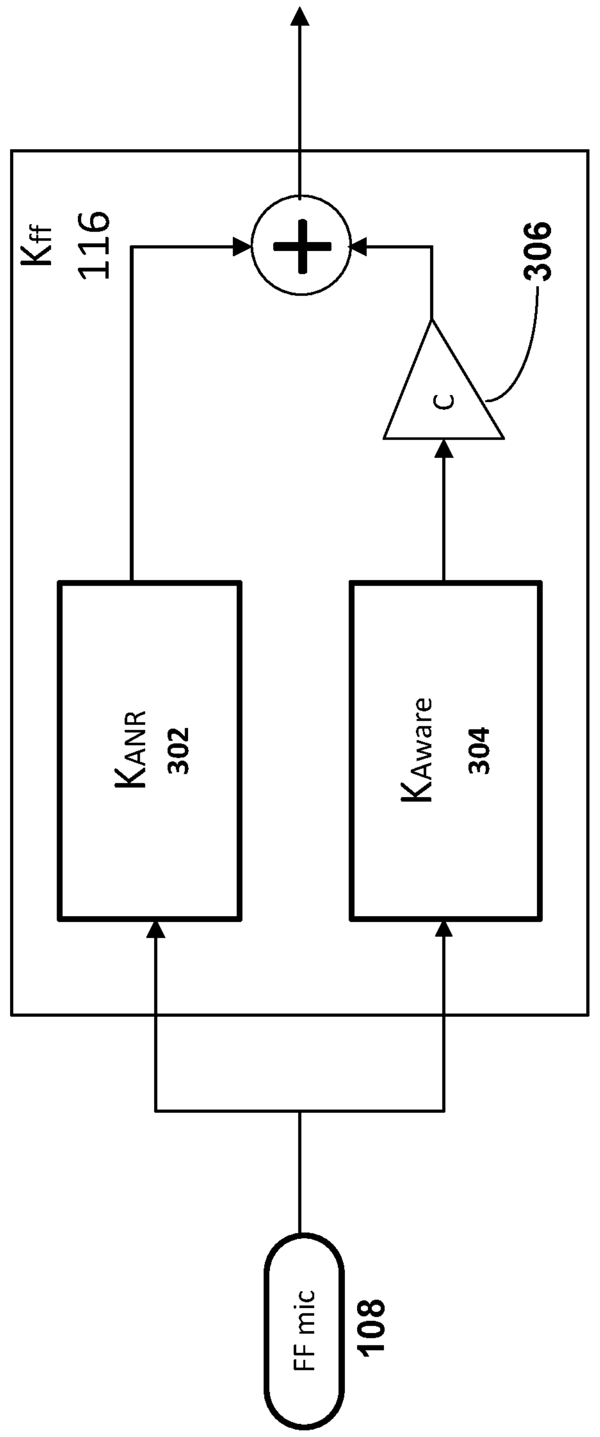
FIG. 3 is a block diagram of a feedforward compensator having an ANR signal flow path disposed in parallel with a pass-through signal flow path.

In some implementations, the ANR system 100 can allow a user to control the amount of ambient noise passed through the device while maintaining ANR functionalities, such as described in U.S. Pat. No. 10,096,313 which is incorporated herein by reference in its entirety. For example, to allow for intermediate target insertion gains between 0 and 1, inclusive, and enable a user to control the amount of ambient noise passed through the device, the feedforward compensator 116 can include an ANR filter 302 and a pass-through filter 304 disposed in parallel, with the gain of the pass-through filter being adjustable by a factor C, as shown in FIG. 3. In some cases, the adjustable gain C may be implemented using a variable gain amplifier (VGA) 306 disposed in the pass-through signal flow path of the feedforward compensator 116. In some cases, the adjustable gain C may be implemented by selecting a set of coefficients for the pass-through filter 304. In some cases, the adjustable gain C may be implemented using a combination of adjustments to a variable gain amplifier 306 and the pass-through filter 304, each disposed in the pass-through signal flow path of the feedforward compensator 116.

In implementations where the headphone 102 includes an aware mode, some conditions can lead to the onset of an unstable condition. For example, if the output of the transducer 112 gets fed back to the feedforward sensor 108, and the ANR system 100 passes the signal back to the transducer 112, a fast-deteriorating unstable condition could occur, resulting in an objectionable sound emanating from the transducer 112. This condition may be demonstrated, for example, by cupping a hand around a headphone to facilitate a feedback path between the transducer 112 and the feedback sensor 108. Such a feedback path may be established during use of the headphone, for example, if the user puts on a headgear (e.g., a head sock or winter hat) over the headphone 102.

In some implementations, the unstable condition could occur due to changes in the transfer function of a secondary path (e.g., an acoustic path between the feedback sensor 110 and the transducer 112) of the ANR system 100. This can happen, for example, if the acoustic path between the transducer 112 and the feedback sensor 110 is changed in size or shape. This condition may be demonstrated, for example, by blocking the opening (e.g., using a finger or palm) through which sound emanates out of the headphone 102. In the case of a headphone having a nozzle with an acoustic passageway that acoustically couples a front cavity of an acoustic transducer to a user's ear canal, this condition may be referred to as a blocked-nozzle condition. This condition can result in practice, for example, during placement/removal of the headphone in the ear. This effect may be particularly observable in smaller headphones (e.g., in-ear earphones) or in-ear hearing aids, where the secondary path can change if the earphone or hearing-aid is moved while being worn. For example, moving an in-ear earphone or hearing aid can cause the volume of air in the corresponding secondary path to change, thereby causing the ANR system to be rendered unstable. In some cases, pressure fluctuations in the ambient air can also cause the ANR system to go unstable. For example, when the door or window of a vehicle (e.g., a bus door) is closed, an accompanying pressure change may cause an ANR system to become unstable. Another example of pressure fluctuations that can result in an unstable condition is a significant change in the ambient pressure of air relative to normal atmospheric pressures at sea level.

Additional situations that may lead to an unstable condition in the ANR system can include deformation of the layer 106 of soft material of the headphone 102, temporarily adjusting the positioning of the headphone 102, or displacing the headphone 102, for example, by lying one's head down to fall asleep.

While instabilities can occur in any ANR system, ANR systems with aware mode are particularly prone to unstable conditions due to the relatively high levels of gain used to provide this feature, particularly for the feedforward signal flow path 114. If an unstable condition is not quickly detected and addressed, the unstable condition may cause the transducer 112 to produce acoustic artifacts (e.g., a loud audible noise, a squeal, a chirp, etc.), which may be uncomfortable for the wearer.

In some cases, signal processing approaches can be used to detect and address existing instabilities in the ANR system 100. While such approaches can prevent the production of undesired acoustic artifacts in the presence of an instability, in some cases, they do not prevent the instability itself.

Another approach to inhibiting the production of acoustic artifacts is to prevent unstable conditions from occurring at all. The technology described herein uses a sensor-based approach to detect the presence or absence of potential causes of unstable conditions and then takes one or more actions accordingly to prevent the occurrence of instabilities and acoustic artifacts in the ANR system. For example, the one or more actions can include adjusting the gain of the pass-through signal flow path using a variable gain amplifier, adjusting the coefficients for a filter disposed in the pass-through signal flow path, and disabling/enabling the pass-through signal flow path. This sensor-based approach may provide the following benefits. First, rather than addressing existing instabilities, the technology described herein can prevent unstable conditions from occurring at all. Second, in cases where instabilities are not successfully prevented, the technology described herein may provide information about the cause of the unstable condition and allow the ANR system to learn to improve future performance. Furthermore, in some cases, the technology described herein may be less expensive, lighter, and less complex to implement than alternative approaches to preventing the production of acoustic artifacts.

Figure 4:
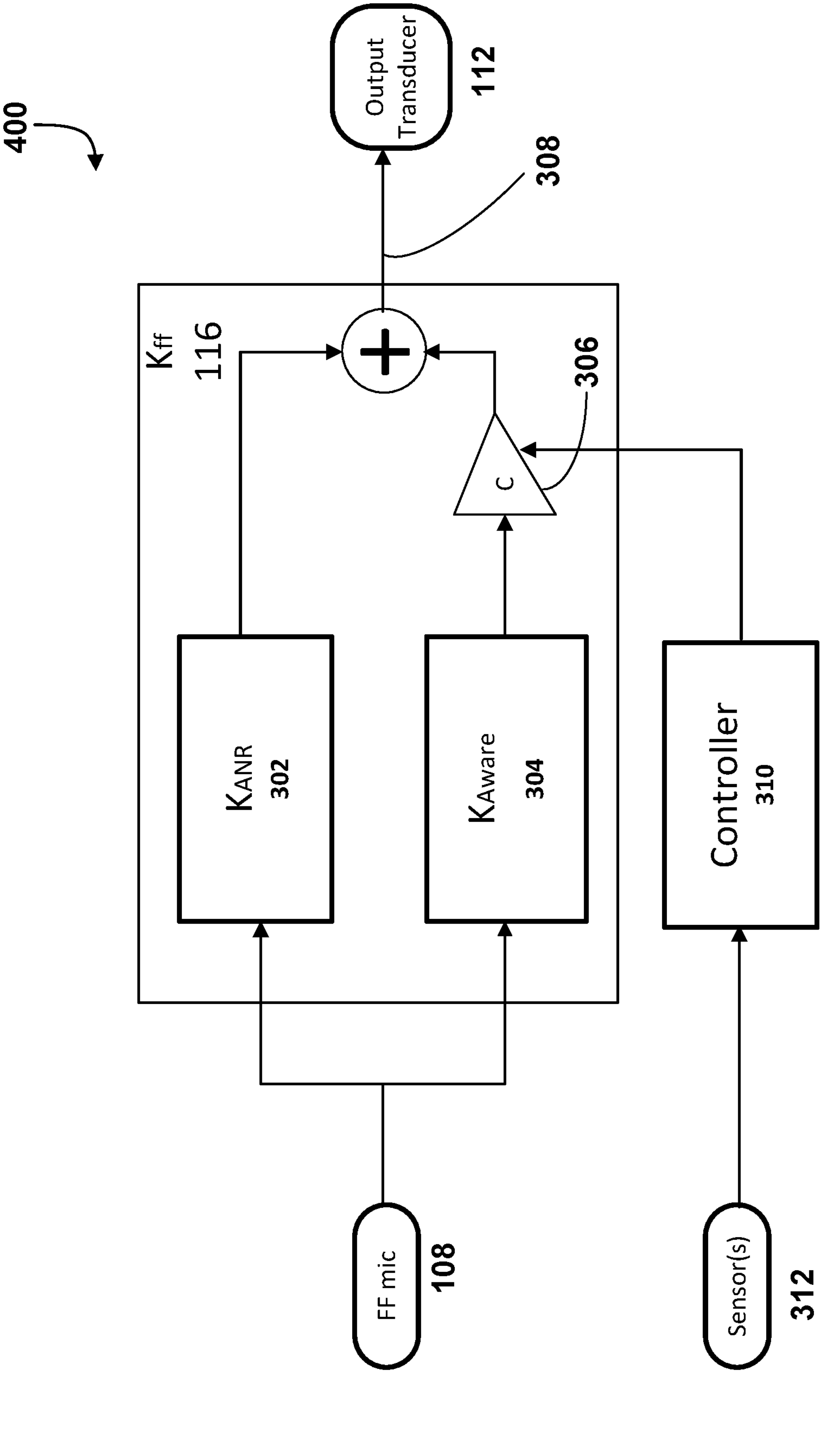
FIG. 4 is a block diagram of an ANR system with sensor-based control of the gain for the pass-through signal flow path in accordance with technology described herein.

FIG. 4 shows a block diagram of an ANR system 400 with sensor-based control of the gain for the pass-through signal flow path in accordance with technology described herein. Like the feedforward compensator of FIG. 3, the ANR system 400 includes an ANR filter 302 and a pass-through filter 304 disposed in parallel, with the gain of the pass-through filter being adjustable by a factor C. The outputs of the ANR filter 302 and the amplified pass-through filter 304 are summed to generate an output signal 308. In some cases, the output signal 308 is used to drive an output transducer (e.g., output transducer 112) of the ANR system 400.

The ANR system 304 further includes a controller 310, which modifies the adjustable gain C in response to receiving input from one or more sensors 312. In some cases, the one or more sensors 312 provide information indicative of the existence (or absence) of a condition that is likely to cause instability in the pass-through signal path. For example, the one or more sensors 312 may include an object sensor or proximity sensor that can detect an approaching hand, indicating that the ANR system 400 (e.g. a headphone) is about to be moved, which is likely to cause instability in the pass-through signal path. In another example, the one or more sensors 312 may detect that the ANR system 400 (e.g. a set of earbuds) is being removed from a user's ears, which may also be likely to cause instability in the pass-through signal flow path. In some cases, the one or more sensors 312 may include capacitive proximity sensors, infrared (IR) sensors, light proximity sensors, etc. In some cases, the one or more sensors may also include the feedforward sensor 108 and/or a feedback sensor (e.g., feedback sensor 110). In some cases, the one or more sensors 312 may further include location sensors, accelerometers, date/time sensors, contact sensors etc.

The controller 310 receives input signals captured from the one or more sensors 312 and determines whether or not the signals are indicative of the existence of a condition likely to cause instability in the pass-through signal flow path. In some cases, the controller may determine that a condition likely to cause instability exists if the one or more sensors 312 include a proximity sensor that detects that an object is less than a threshold distance from the one or more sensors 312, the feedforward sensor 108, a feedback sensor (e.g., feedback sensor 110), or the body of the ANR system 400 (e.g. headphone 102). The threshold distance may be a predetermined distance in the range of 0 ft-3 ft (e.g., 1 inch, 2 inches, 3 inches, 6 inches, 1 foot, 2 feet, etc.). In some cases, the controller 310 may determine that a condition likely to cause instability exists if the one or more sensors 312 include a proximity or contact sensor (e.g., a capacitive touch sensor) that detects that an object has made contact with a surface.

In some cases, one or more forms of artificial intelligence, such as machine learning, can be employed such that the controller 310 may learn to determine a condition's likelihood to cause instability in the ANR system 400 from training data, without being explicitly programmed for the task. Using this training data, machine learning may employ techniques such as regression to estimate the probability that the data collected by the one or more sensors 312 is indicative of the existence of a condition that will cause instability. To produce such estimates, one or more quantities may be defined to indicate the probability that instabilities will be present in the ANR system 400. As such, upon being trained, a learning machine may be capable of outputting a numerical value that represents the probability of an instability occurring in the ANR system 400.

To implement such an environment, one or more machine learning techniques may be employed. For example, supervised learning techniques may be implemented in which training is based on a desired output (e.g., whether or not an instability occurred) that is known for an input (e.g., the data collected by the one or more sensors 312). Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies. For example, in some cases, the learning applied can be considered as not exactly supervised learning since the presence of instabilities in the ANR system 400 can be considered unknown prior to receiving feedback from a user. In other cases, when feedback from the user is present as a performance measure, a reinforcement learning technique can be implemented.

In some arrangements, neural network techniques may be implemented using the information from the one or more sensors 312 (e.g., proximity data, audio data, etc.) to invoke training algorithms for automatically learning the likelihood that a condition exists that will cause an instability in the ANR system 400. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. By using the information from the one or more sensors 312, a function may be defined that quantifies error (e.g., a squared error function used in regression techniques). By minimizing error, a neural network may be developed that is capable of estimating the likelihood that a condition will cause an instability in the ANR system 400. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques 3*o* may be implemented to reduce its effects.

A variety of features may be used for training and using a machine learning system. Features may include, for example, data from the one or more sensors 312 including proximity data, audio data, date/time information, location data, etc. In some arrangements, the features may be processed prior to being used for machine training (or for use by a pre-trained machine). For example, a vector that represents a collection of sensor data may be normalized so that training data used can be considered as being placed on an equal basis. Such normalizing operations may take many forms. For example, an estimated value (e.g., average) and standard deviation (or variance) may be calculated for each feature. Once these quantities are calculated (e.g., the average and standard deviation), each feature is normalized using the data.

Once trained, the controller 310 may be used to determine the likelihood that a condition exists that will cause instabilities in the ANR system 400. Using any of the methods described above, if the controller 310 determines that a condition is likely to cause instability in the pass-through signal flow path, the controller 310 may reduce the variable gain C. By reducing the variable gain C, the controller 310 creates more headroom in the ANR system 400, which results in fewer opportunities for clipping, and provides more margin to prevent instabilities, for example, due to coupling between the feedforward sensors and the transducer. The term headroom, as used herein, refers to the difference between the signal-handling capabilities of an electrical component and the maximum level of the signal in the signal path, such as the feedforward signal path. In some cases, reducing the variable gain C can be done by setting the variable gain C to zero, or a value substantially equal to zero, effectively shutting off any contribution from the pass-through signal flow path. This can be considered equivalent to "turning off" the aware mode. In some cases, reducing the variable gain can be done by adjusting the gain of a variable gain amplifier (e.g., VGA 306). In some cases, reducing the variable gain C can include selecting a set of coefficients for a filter disposed in the pass-through signal path, such as pass-through filter 304. At a later point in time, if the controller 310 determines that the condition likely to cause instability in the pass-through signal flow path no longer exists, the controller 310 may increase the variable gain C. Increasing the variable gain C can be achieved by setting the variable gain C to a value substantially different from zero (i.e., "turning on" aware mode), adjusting the gain of a VGA, and/or selecting a new set of coefficients for a filter disposed in the pass-through signal path, such as pass-through filter 304.

In some cases, in response to detecting the presence or absence of a condition likely to cause instability, the controller 310 may disable or enable the pass-through signal flow path. For example, the controller 310 may disable and enable the pass-through signal flow path by controlling a switch (not shown). The switch may be disposed anywhere along the pass-through signal flow path (e.g., immediately before pass-through filter 304, immediately after pass-through filter 304, immediately after variable gain amplifier 306, etc.). The switch can be implemented as a hardware switch, as a software switch, or as a combination of both hardware and software components. When the pass-through signal flow path is disabled, this can be considered equivalent to "turning off" the aware mode. When the pass-through signal flow path is enabled, this can be considered equivalent to "turning on" the aware mode.

While the above description shows the use of an exclusively sensor-based approach for adjusting the gain of the pass-through signal flow path (i.e., to enter or exit aware mode), in some cases, the sensor-based approach disclosed herein (in which instability may be preempted based on sensor data) may be combined with signal processing approaches (in which unstable conditions are mitigated upon occurrence) for detecting and addressing instabilities in the ANR system 400. For example, a signal processing approach may be implemented to detect and address existing instabilities in the ANR system 400. When an instability is detected, the controller 310 can turn off aware mode by setting the adjustable gain C to zero. At that time, the data from the one or more sensors 312 can be recorded, and when the data from the one or more sensors 312 changes significantly (indicating a change in the condition that caused the instability), the sensor-based approach can then be used to enter aware mode once again (e.g., by increasing the adjustable gain C). Additional examples of signal-processing based approaches of instability mitigation can be found in U.S. application Ser. Nos. 16/423,776 and 16/424,063, the contents of which are incorporated herein by reference.

In another example, a signal processing approach and a sensor-based approach can be implemented simultaneously. The sensor-based approach may act as a first defense to prevent the occurrence of any unstable conditions in the ANR system 400; however, in cases where the sensor-based approach does not succeed in detecting a condition likely to cause instability, a signal processing approach can then detect and address the existing instability, such that an acoustic artifact is never produced for the user.

In addition to providing fewer acoustic artifacts to the user, combining the disclosed sensor-based approach with signal processing approaches can enable active learning of the controller 310. Since signal processing approaches are able to detect existing instabilities, these approaches can provide automatic feedback to the controller 310 regarding the accuracy of its assessment about a condition's likelihood to cause instability in the ANR system 400. This can be used as additional and automatically generated training data for the machine learning techniques described above, enabling the ANR system 400 to continually learn and improve performance without requiring explicit feedback from the user.

While FIG. 4 depicts a particular example arrangement of components for implementing the technology described herein, other components and/or arrangements of components may be used without deviating from the scope of this disclosure. In some implementations, the arrangement of components along a feedforward path can include an analog microphone, an amplifier, an analog to digital converter (ADC), a feedforward compensator, in that order. This arrangement is similar to the arrangement of components depicted in FIG. 4 with the addition of an ADC between each feedforward microphone 108 and the feedforward compensator 116 (which, in this example, includes a variable gain amplifier (VGA)). In some implementations, the arrangement of components along a feedforward path can include an analog microphone, an ADC, a VGA, and a feedforward compensator.

Figure 5:
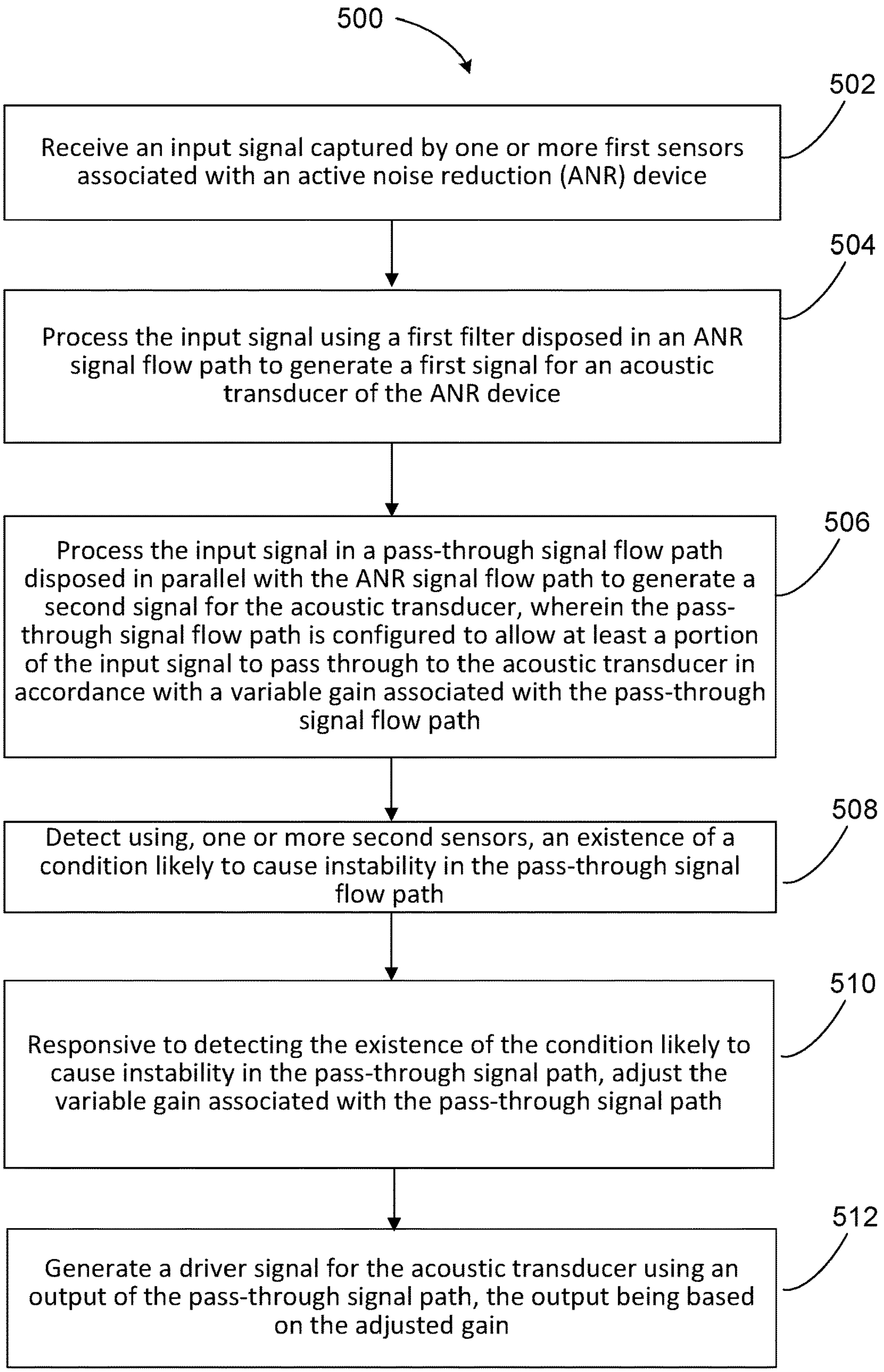
FIG. 5 is a flowchart of an example process for generating a driver signal for an acoustic transducer in an ANR system having a pass-through signal flow path with adjustable gain.

FIG. 5 is a flowchart of an example process 500 for generating an output signal in an ANR system having a pass-through signal flow path with adjustable gain. At least a portion of the process 500 can be implemented using one or more processing devices such as DSPs described in U.S. Pat. Nos. 8,073,150 and 8,073,151, incorporated herein by reference in their entirety. Operations of the process 500 include receiving an input signal captured by one or more first sensors associated with an active noise reduction (ANR) device (502). In some implementations, the one or more first sensors include a feedforward sensor and/or a feedback sensor, such as the feedforward sensor 108 and the feedback sensor 112 described with reference to FIG. 1. In some implementations, the feedforward sensor is a feedforward microphone, and the feedback sensor is a feedback microphone. In some implementations, the ANR device can be an around-ear headphone such as the one described with reference to FIG. 1. In some implementations, the ANR device can include, for example, in-ear headphones, on-ear headphones, open headphones, hearing aids, or other personal acoustic devices. In some implementations, the input signal captured by the one or more first sensors can be an audio signal representative of ambient noise associated with the ANR device.

Operations of the process 500 further include processing the input signal using a first filter disposed in an ANR signal flow path to generate a first signal for an acoustic transducer of the ANR device (504). In some implementations, the first filter can be an ANR filter 302 such as the one described with reference to FIG. 3 and FIG. 4. In some cases, the first filter is disposed in a feedforward signal flow path of the ANR device, such as the feedforward signal flow path 114 described with reference to FIG. 2. In some implementations, the acoustic transducer of the ANR device can be an acoustic speaker or other output transducer 112 such as the one described with reference to FIG. 4.

Operations of the process 500 further include processing the input signal in a pass-through signal flow path disposed in parallel with the ANR signal flow path to generate a second signal for the acoustic transducer, wherein the pass-through signal flow path is configured to allow at least a portion of the input signal to pass through to the acoustic transducer in accordance with a variable gain associated with the pass-through signal flow path (506). In some implementations, the pass-through signal flow path can be a signal flow path that includes a pass-through filter 304 such as the one described with reference to FIG. 3 and FIG. 4. In some implementations, the pass-through signal flow path is disposed in parallel with the ANR signal flow path in a feedforward signal flow path of the ANR device, such as the feedforward signal flow path 114 described with reference to FIG. 2. In some implementations, the variable gain associated with the pass-through signal flow path can be an adjustable gain such as the adjustable gain C described with reference to FIG. 3 and FIG. 4. In some implementations, the portion of the input signal allowed to pass through to the acoustic transducer can correspond to a portion of ambient noise in the user's environment that the user may wish to hear, such as human voices, the sound of an approaching car, etc.

Operations of the process 500 further include detecting using, one or more second sensors, an existence of a condition likely to cause instability in the pass-through signal flow path (508). In some implementations, the one or more second sensors can correspond to the one or more sensors 312 described with reference to FIG. 4 and can include capacity proximity sensors, infrared (IR) sensors, light proximity sensors, feedforward sensors (e.g. feedforward sensor 108), feedback sensors (e.g., feedback sensor 110), location sensors, accelerometers, date/time sensors, etc. In some implementations, detecting the condition likely to cause instability in the pass-through signal flow path can include detecting that an object is less than a threshold distance from the one or more second sensors (e.g. sensors 312) or the body of the ANR device. In some implementations, detecting the condition likely to cause instability in the pass-through signal flow path can include using one or more forms of artificial intelligence, such as machine learning to determine a condition's likelihood to cause instability in the ANR device from training data, without being explicitly programmed for the task.

Operations of the process 500 further include, responsive to detecting the existence of the condition likely to cause instability in the pass-through signal path, adjusting the variable gain associated with the pass-through signal path (510). In some implementations, adjusting the variable gain associated with the pass-through signal path can include reducing the variable gain. In some implementations, reducing the variable gain can include setting the variable gain to zero or a value substantially equal to zero; adjusting the gain of a variable gain amplifier (e.g., VGA 306); and/or selecting a set of coefficients for a filter disposed in the pass-through signal path, such as pass-through filter 304

Operations of the process 500 further include generating a driver signal for the acoustic transducer using an output of the pass-through signal path, the output being based on the adjusted gain (512). In some implementations, the driver signal for the acoustic transducer can be the output signal 308 described with reference to FIG. 4. In some implementations, the output of the pass-through signal path is used to generate the driver signal by summing the output with signals from other flow paths (e.g., an ANR signal flow path including ANR filter 302, a feedback signal flow path 118, an audio path 122, etc.).

Figure 6:
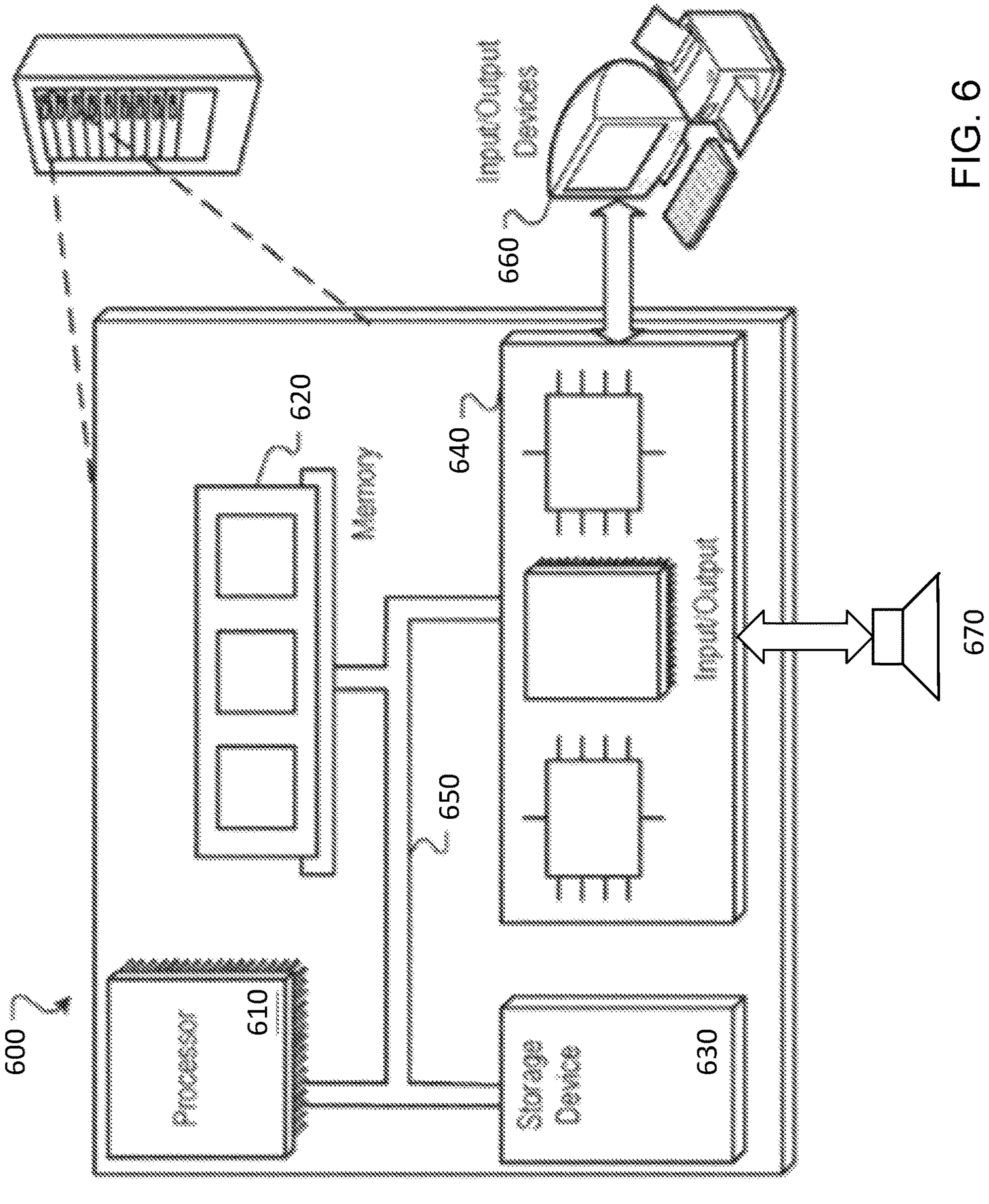
FIG. 6 is a block diagram of an example of a computing device usable for implementing technology described herein.

FIG. 6 is block diagram of an example computer system 600 that can be used to perform operations described above. For example, any of the systems 100 or 400, as described above with reference to FIGS. 1 and 4, respectively, can be implemented using at least portions of the computer system 600. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/ output device 640 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660, and acoustic transducers/speakers 670.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

To provide for interaction with a user, embodiments of the subject matter described in this specification can be implemented on a computer having a display device, e.g., a light emitting diode (LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method, comprising:

receiving an input signal produced by one or more first sensors;

processing the input signal to generate respective signals for a first signal path and a second signal path disposed in parallel with the first signal path;

detecting an existence of a condition likely to cause instability in the second signal path, wherein the condition likely to cause instability in the second signal path comprises a condition likely to cause coupling between an output of the second signal path and at least one of the one or more first sensors;

responsive to detecting the existence of the condition likely to cause instability in the second signal path, adjusting processing associated with the second signal path; and generating a driver signal for an acoustic transducer using an output of the second signal path.

2. The method of claim 1, wherein the first signal path comprises an active noise reduction (ANR) signal path.

3. The method of claim 1, wherein the second signal path comprises a pass-through signal path configured to allow at least a portion of the input signal to pass through to the acoustic transducer, and wherein the condition likely to cause instability in the second signal path comprises a condition likely to cause coupling between the portion of the input signal passed through the second signal path and the at least one of the one or more first sensors.

4. The method of claim 1, wherein processing the input signal comprises:

processing the input signal with a first filter disposed in the first signal path to generate a first signal; and processing the input signal with a second filter disposed in the second signal path to generate a second signal, wherein the second filter is different from the first filter.

5. The method of claim 1, wherein detecting the existence of the condition likely to cause instability in the second signal path comprises detecting, using one or more second sensors, that an object is within a predetermined distance from at least one of the one or more first sensors or the one or more second sensors.

6. The method of claim 1, wherein detecting the existence of the condition likely to cause instability in the second signal path comprises processing at least one of the input signal produced by the one or more first sensors or a feedback signal produced by one or more second sensors to detect an instability.

7. The method of claim 1, wherein adjusting the processing associated with the second signal path comprises adjusting a variable gain associated with the second signal path.

8. The method of claim 1, wherein adjusting the processing associated with the second signal path comprises adjusting one or more coefficients of a filter disposed in the second signal path.

9. The method of claim 1, wherein adjusting the processing associated with the second signal path comprises disabling the second signal path.

10. The method of claim 1, further comprising:

detecting that the condition likely to cause instability in the second signal path is no longer in existence; and responsive to detecting that the condition likely to cause instability in the second signal path is no longer in existence, adjusting the processing associated with the second signal path.

11. A device, comprising:

an acoustic transducer;

one or more first sensors configured to generate an input signal indicative of an external environment of the device;

at least one filter configured to process the input signal to generate respective signals for a first signal path and a second signal path disposed in parallel with the first signal path; and a controller comprising one or more processing devices, the controller configured to:

detect an existence of a condition likely to cause instability in the second signal path, wherein the condition likely to cause instability in the second signal path comprises a condition likely to cause coupling between an output of the second signal path and at least one of the one or more first sensors, and responsive to detecting the existence of the condition likely to cause instability in the second signal path, adjust processing associated with the second signal path, wherein the acoustic transducer is driven by a driver signal that is based on an output of the second signal path.

12. The device of claim 11, wherein the first signal path comprises an active noise reduction (ANR) signal path.

13. The device of claim 11, wherein the second signal path comprises a pass-through signal path configured to allow at least a portion of the input signal to pass through to the acoustic transducer.

14. The device of claim 11, wherein the controller is configured to detect the existence of the condition likely to cause instability in the second signal path by detecting, using one or more second sensors of the device, that an object is within a predetermined distance from at least one of the one or more first sensors or the one or more second sensors.

15. The device of claim 11, wherein the controller is configured to detect the existence of the condition likely to cause instability in the second signal path by processing at least one of the input signal produced by the one or more first sensors or a feedback signal produced by one or more second sensors to detect an instability.

16. The device of claim 11, wherein the controller is configured to adjust the processing associated with the second signal path by adjusting a variable gain associated with the second signal path.

17. The device of claim 11, wherein the controller is configured to adjust the processing associated with the second signal path by adjusting one or more coefficients for the at least one filter.

18. The device of claim 11, wherein the controller is configured to adjust the processing associated with the second signal path by disabling the second signal path.

19. The device of claim 11, wherein the controller is configured to:

detect that the condition likely to cause instability in the second signal path is no longer in existence; and responsive to detecting that the condition likely to cause instability in the second signal path is no longer in existence, adjust the processing of the input signal in the second signal path.

20. One or more non-transitory machine-readable storage devices having encoded thereon computer readable instructions for causing one or more processing devices to perform operations comprising:

receiving an input signal produced by one or more first sensors;

processing the input signal to generate respective signals for a first signal path and a second signal path disposed in parallel with the first signal path;

detecting an existence of a condition likely to cause instability in the second signal path, wherein the condition likely to cause instability in the second signal path comprises a condition likely to cause coupling between an output of the second signal path and at least one of the one or more first sensors;

responsive to detecting the existence of the condition likely to cause instability in the second signal path, adjusting processing associated with the second signal path; and causing generation of a driver signal for an acoustic transducer using an output of the second signal path.

* * * * *